(12) United States Patent
Filkovsky et al.

(10) Patent No.: US 6,219,717 B1
(45) Date of Patent: Apr. 17, 2001

(54) METHOD AND APPARATUS FOR IMPLEMENTING OBJECT TRANSPARENT INVOCATION

(75) Inventors: Genady Filkovsky, New York; Yuriv Margulis, Brooklyn; Kevin Sawyer, Lawrenceville, all of NY (US)

(73) Assignee: Merrill Lynch & Co., Inc., New York, NY (US)

( * ) Notice: Subject to any disclaimer, the term of this patent is extended or adjusted under 35 U.S.C. 154(b) by 0 days.

(21) Appl. No.: 08/752,544

(22) Filed: Nov. 20, 1996

(51) Int. Cl.$^7$ ........................................... G06F 9/00
(52) U.S. Cl. ................................................ 709/315
(58) Field of Search ........................ 395/680, 683, 395/200; 709/300, 303, 310, 315, 316, 103

(56) References Cited

U.S. PATENT DOCUMENTS

| | | |
|---|---|---|
| 4,768,150 | 8/1988 | Chang et al. ............ 709/328 |
| 4,843,540 | 6/1989 | Stolfo .................... 712/11 |
| 5,079,695 | 1/1992 | Dysart et al. ............ 709/316 |
| 5,247,669 | 9/1993 | Abraham et al. ......... 707/103 |
| 5,265,206 | 11/1993 | Shackelford et al. ..... 709/316 |
| 5,280,610 * | 1/1994 | Travis, Jr. et al. ..... 707/103 |
| 5,303,379 | 4/1994 | Khoyi et al. ............ 717/10 |
| 5,341,478 * | 8/1994 | Travis .................. 395/200.33 |
| 5,343,409 | 8/1994 | Satterfield et al. ..... 709/223 |
| 5,410,650 * | 4/1995 | Sasaki .................. 395/200.8 |
| 5,414,812 | 5/1995 | Filip et al. ............ 707/103 |
| 5,448,734 * | 9/1995 | Hrabik .................. 395/680 |
| 5,481,721 | 1/1996 | Serlet et al. ........... 709/315 |
| 5,504,892 | 4/1996 | Atsatt et al. ........... 707/103 |
| 5,640,564 * | 6/1997 | Hamilton et al. ........ 709/303 |
| 5,822,580 * | 1/1996 | Leung .................. 707/103 |

OTHER PUBLICATIONS

Eckel, Bruce, "Polymorphism and Virtual Functions in C++," Embedded Systems Programming, pp(17), Oct. 1994.*
web site–http://www4.nanvaent.org/.
Inside Dynamic HTML, §Event Broadcaster, Scott Isaacs Microsoft Press ISBN 1–57231–686–1.
Adding Implicit Invocation to Languages: Three Approaches, Notkin et al.

* cited by examiner

*Primary Examiner*—Alvin E. Oberley
*Assistant Examiner*—St. John Courtenay, III
(74) *Attorney, Agent, or Firm*—Hopgood, Calimafde, Judlowe & Mondolino, LLP

(57) ABSTRACT

A method and apparatus for implementing object-transparent invocation operates in conjunction with a data processing system having a memory, a sender and at least one method capable of performing a function to advantageously deliver a message to the at least one method capable of performing a function, thereby (i) delivering the message without requiring the sender to have specific knowledge of the identity, address, name or existence of the at least one method capable of servicing the message, (ii) delivering the message to the at least one method capable of servicing the message, and/or (iii) delivering the message to the at least one method capable of servicing the message, without the use of identity, address or name information provided by the sender.

10 Claims, 2 Drawing Sheets

METHOD AND APPARATUS FOR IMPLEMENTING OBJECT TRANSPARENT INVOCATION

BACKGROUND OF THE INVENTION

This invention relates to a method and apparatus for transparent invocation of object functionality, and more specifically, to a method and apparatus for initiation of the functions provided by an object's methods without specific knowledge of the identity, address, name or existence of the object.

DESCRIPTION OF RELATED ART

In recent years, programmers have developed a technology for building computer application programs out of building blocks called objects. Objects are involved in an application's activity by means of messages. In other words, to invoke the functions of a target object, a message is sent to the target, and the target object's functionality is invoked in response to the message.

As is well known in the art, objects of one type are defined by their attributes and methods. More specifically, attributes define properties or characteristics that can differ between objects of the same type, and methods define the functional behaviors of all objects of the same type.

All objects of the same type behave essentially in the same manner because they all share the same methods, but each object has its own instances of attributes and one object of a type may differ from another object of the same type by the attributes' actual values, i.e. by their contents.

To use an example, color may be an attribute of the objects of a given type. Each object of the type would have a color attribute, but the value of the color attribute may differ from one object to another object of the type. The behavior, or way the objects change color, is controlled by the method. Thus, for example, each object of this type may change from one color to another color in the same way.

Objects may be implemented in memory areas, screen images, disk files and other ways known in the art. Methods may be implemented in programs, scripts, functions and other ways known in the art.

As mentioned above, objects respond to messages. A message may be sent to request services of an object or to notify an object of events. For clarity, the source of a message, e.g., a program, a script or a procedure, where the message is originated, may be referred to as the sender, and the object which executes application functionality in response to a message may be referred to as the receiver.

Technically, a receiver may be comprised of more than one object, i.e. it can be a compound object. Common examples of such compound objects would include a window (object) with buttons (objects) on it, or a window (object) with message boxes (objects) which it may open during execution of its functionality, or a sheet (object) with a toolbar (object). A group of objects is considered a single component, i.e. a compound object, when the group: (i) is incorporated in an application as a whole, (ii) is created and destroyed in a single operation, and (iii) handles its internal composition and structure by itself.

The method by which a receiver responds to a message may be hidden from the sender; a method so hidden from the sender is known as an encapsulated method. Encapsulation of the method is desirable because the encapsulated method can be modified without needing to modify the sender.

An encapsulated method provides senders with its interface, i.e. messages to which this method responds. Only interfaces of encapsulated methods are open and known to senders. A set of interfaces of all methods of a particular receiver is referred to as the receiver's interface.

It is also well known, after composing a message, that a sender sends the message for a particular receiver. Thus, the sender must know the identity of the receiver. In other words, two components need to be specified for an object's functionality to be invoked: a receiver identity, which is an identifier for the particular receiver of the particular type; and the message, which may include a specific function request and the function's execution parameters. There are many known ways to define identity of a receiver, typically it is represented by a pointer or handle, i.e., a physical or logical address of the receiver.

Since receivers are created and destroyed dynamically during an application's execution, the identity of a receiver is usually determined at run time. Thus, to permit senders to become "acquainted" with receivers, a run time identification mechanism is required. Such a run time mechanism complicates the structure and function of senders and can require significant system resources, which makes development and maintenance cumbersome. Some examples of the run time identification mechanisms that are used to acquaint receivers include: storing receiver's identity using a global variable accessible throughout an entire application; and passing a receiver's identity as a parameter during the sender's initial invocation.

Thus, while conventional messaging systems allow for the implementation of methods that respond to messages from unknown senders, the sender is still required to definitively identify a receiver when sending a message. The limitations of this requirement have been referred to in the literature as the acquaintance problem. See, for example, *Directions in Object-Oriented Research*, D. Tsichritzis, O. Nierstrasz, and *Object-Oriented Concepts, Databases, and Applications*, W. Kim and F. Lochovsky, ACM Press, New York, 1989, pp. 523–536, both incorporated herein by reference. These limitations are a major drawback of conventional messaging and pose several substantial difficulties for application development and maintenance.

The acquaintance problem, often results in otherwise unnecessary modification to senders. For example, it is well known that when application architecture changes senders often need to be modified to reflect a change in the identity of a receiver. This is often true even if the methods and interface of the receiver stay the same. This problem may be caused, for example, if the order of object creation in an application is changed, or if the application architecture is changed to permit multiple objects of the same type.

In conventional systems it is often the case that a sender's implementation can depend upon the way messages are associated with receivers. In such a case, the sender may need to be modified when the receiver associated with a message is changed, even if the message stays the same. This problem may arise where a receiver of a different type is used to replace the original receiver. It may also occur where the receiver's interface is split between several receivers with narrower functionality or where the interfaces of several receivers are combined.

It is a common practice among programmers of ordinary skill in the art to replace an original receiver with a descendant having, for example, extended or specialized functionality. This may require that the sender be modified even though the sender does not take advantage of the extended functionality. This may result from using global variables which are automatically defined by an underlying system, in an effort to ease object identification for various types of objects.

Also due to the acquaintance problem, otherwise unnecessary modifications are also required when a sender is migrated to a different application context where receivers providing the same services are identified differently or have split, combined or rearranged interfaces.

A number of different solutions to the acquaintance problem have been proposed.

Dynamic adaptation is one proposed solution to the acquaintance problem. Dynamic adaptation systems are disclosed in *Adapting Object-Communication Methods Dynamically*, Yoshinori Kishimoto, Nobuto Kotaka, Shinichi Honiden, IEEE Software, Vol. 12, No. 3, May 1995, pp. 65–74, incorporated herein by reference.

A dynamic adaptation system caches specifications of the methods for the object types. In a dynamic adaptation system, when a sender migrates into a different environment and issues a message requesting the services of another object, the specifications of methods of objects in the new environment are compared to the stored specification of the method of the receiver in the original environment and the message is dynamically changed and redirected. Thus, although the sender identifies the receiver's type, the actual receiver may be of a different type.

Also, in a dynamic adaptation system, the message sent may not exactly fit the interface of the actual receiver. When this happens, the message is translated based on the type of the original receiver, the method, and additional specifications of the original and the new receivers and their respective methods.

Thus, in a dynamic adaptation system each receiver provides the messaging mechanism with the specifications of its methods and the system maintains a cache of these specifications. Then, when a sender sends a message destined for a receiver that is not available, the messaging mechanism compares the stored specifications of the identified method to specifications of available methods. When a similar method is found, the messaging mechanism translates the original message into a new message, specifies the ID and type of the new object and sends a new message.

Accordingly, although a dynamic adaptation system alleviates the acquaintance problem, it creates significant overhead in system development and maintenance. The development and maintenance overhead results from the need to properly create and maintain a specification for each method using a formal specification language.

Furthermore, in order to work properly, dynamic adaptation requires that the message and specification analysis is centralized, and sufficiently generalized to cover all possible messages and specifications. Because the analysis is external to the receiving objects it must also be comprehensive. Thus, another drawback of dynamic adaptation is that it creates significant performance degradation because of the significant processing power required to analyze messages and specifications. Moreover, no satisfactory, industry-accepted language for method specification and comparison exists, limiting dynamic adaptation's practical use.

An additional limitation of the dynamic adaptation is that it dynamically determines only a type of a receiver and thus may be applicable only in situations where only one object of a given type exists.

Another system that addresses the acquaintance problem is disclosed in U.S. Pat. No. 5,341,478, to Travis, Jr., et al., incorporated herein by reference. Such systems are sometimes called, dynamic invocation systems. A dynamic invocation system provides a data base for storing names of object types, messages supported by these types, methods supporting these messages, locations of these methods implementations, and other information. A dynamic invocation system is designed to support methods that are implemented in independent applications that can reside on different computers and/or different platforms that may be connected by a network. A dynamic invocation system allows messages to be sent in a conventional manner without the sender being aware of actual location or platform of the supporting method.

In a dynamic invocation system, each method provides a messaging mechanism with information of supported object types and messages, object identities, and other information, all of which is stored in a message mechanism database. The sender constructs a message, and sends to the message mechanism, specifying a receiver's ID and type. The message mechanism searches the database for a method supporting the message for the specified type. The message is then translated to a new message that can be accepted by the located method. The translated message is sent to the ID and type specified.

A dynamic invocation system resolves only part of the acquaintance problem, i.e. it makes the actual method invoked transparent to the sender. The sender is still required to identify an appropriate object. Accordingly, the limitations of conventional messaging discussed above related to receiver identification (e.g., run time identification mechanism, dependence on the entire application architecture) are still present using dynamic invocation.

Another approach at resolving the acquaintance problem is called user assisted messaging resolution. One implementation of such a system is described in U.S. Pat. No. 5,303,379 to Khoyi, et al., incorporated herein by reference. Such a system provides object management data structures which include an object catalog and an object manager table. The object catalog is a catalog of all objects residing in the system. When a user selects an operation on a given object, an object management routine searches the data structures and invokes an object manager that corresponds to that object type and operation. This user assisted messaging resolution does not address the general acquaintance problem in an automated manner.

Another limited solution for acquaintance problem may be achieved by using predefined broadcasting mechanisms although they are not provided for this purpose, for example, Windows API function SendMessage. See *Microsoft Windows Software Development Kit Programmer's Reference, Volume 2: Functions*, Microsoft Corporation, 1992, p.814, incorporated herein by reference. This function allows senders to send a message to all top-level windows without identifying these windows. When a message is sent in this way, a specific procedure of each one of the top-level windows is invoked with the message passed to it. Each window then may analyze the message and respond to it appropriately. Since all receivers for a message being sent in this way are predefined, the sender does not need to identify a receiver when sending a message.

As a solution to the acquaintance problem, this method has very limited applicability because of the fact that all receivers for a message are predefined, i.e. only a certain group of receivers, and all of that group of receivers, receive a message. Application designers cannot specify receivers—exclude some top level windows or include other application objects- and cannot control the broadcasting process. For example, an application designer cannot request the broadcasting process to stop sending the message after one of the receivers performs a requested function.

The limitations of the predefined broadcasting are partially reduced in an advanced broadcasting mechanism. See *Interface Object*, Merrill Lynch seminars, NY/NJ, 1995–1996, incorporated herein by reference. In this advanced broadcasting, a special class, Interface Object, is defined providing a specific invocation method, "Process". To be invoked by this advanced broadcasting, a receiver should have an instance of the Interface Object associated with it and should have the Process method of this Interface Object overridden. The Interface Object knows the identity of the associated receiver and has a very close knowledge of its methods. A message can be sent in such way that the Process method of each instance of Interface Object is invoked with the message passed to it. Each Interface Object can then analyze the message in its Process method with respect to its associated receiver and invoke the associated receiver's methods as appropriate.

This system allows object invocation without referring to the object, but it requires creation of an infrastructure of specialized instances of the Interface Object, which complicates an application's structure and makes development and maintenance more cumbersome because of the need to handle these objects outside of the application's functional receivers. The existence of an inter-object structure, i.e. specialized instances of Interface Object which have a knowledge of the identities, messages and methods of functional objects, leads to drawbacks similar to the ones described previously in respect to other prior art systems, for example using a method specification language or a classes and methods database.

SUMMARY OF THE INVENTION

The preferred embodiments of the present invention overcome the problems with the prior art systems by providing a method and apparatus for implementing object transparent invocation, and more specifically, a method and apparatus for initiation of object functionality without specific knowledge of the identity, address, name or existence of object(s) capable of performing the action.

The preferred embodiments of the present invention provide a method and apparatus for initiating an action in response to a message from a sender comprising the steps of: storing, in memory, an application specific registry having a method identifier corresponding to at least one method capable of performing a function; receiving a message from the sender; selecting a method identifier in the registry based upon information contained in the registry; sending the message to the method corresponding to the selected method identifier; and repeating the steps of selecting and sending until a condition is satisfied, the condition being effected by the steps of selecting and sending. A method of a receiver may be registered for selection by, in any way, providing sufficient means to identify an object and a method to invoke. Storage of the set of registered object identifiers and methods, the registry, can but is not limited to taking the form of an array, a linked-list in memory, a file, etc. In any case, the timing and means of populating the registry is application specific.

The present invention has many advantages over the prior art, for example, a sender does not depend on the types of objects responding to a message, nor on the existence or readiness of other objects, nor on the application architecture.

Using the present invention developers need not match their respective object type definitions or to synchronize their development pace.

With the present invention, applications are easier to maintain, and senders need not be changes due to, for example, a change in the relationship between messages and receivers, or changes (e.g., splits, combinations or rearrangements) to the receivers' interfaces.

Using the method of the present invention, old objects can be removed from the application and new objects implementing the same messages may be included in the application changing the functionality of the application without modification to the senders. Newly added or combined objects will cooperate using the same messaging language and by virtue of being in the same application without any need to know more about the system.

The present invention can operate without special requirements or restrictions regarding the type of application, messaging language or underlying operating system.

More features and advantages of the present invention will become apparent from the following description of the preferred embodiments of the present invention which are shown in the accompanying drawings.

DETAILED DESCRIPTION OF PREFERRED EMBODIMENTS

The present invention may be implemented on any data processing system such as, for example a MS-DOS® or Windows® based personal computer using an Intel Pentium microprocessor CPU. The present invention may also be implemented in a data processing network comprising any number of data processing systems, interconnected by a network. The invention relates to object invocations within an application environment or within an inter-application environment. Accordingly, the invention provides a system that is designed to support methods which are implemented in one application, or in multiple, independent applications. The application or applications can reside on a single computer, or on different computers and/or different platforms that are connected by a network. For the purpose of describing the present invention, the terms data processing system and data processing network are used interchangeably, and each is intended to encompass the other. Furthermore, the term application is intended to encompass a single application program or a group of interoperating application programs. Any language, including higher level languages and machine languages can be used to implement the present invention, for example, C, C++, Forth, Java, PowerBuilder, Basic or Visual Basic may be used.

Figure 1:
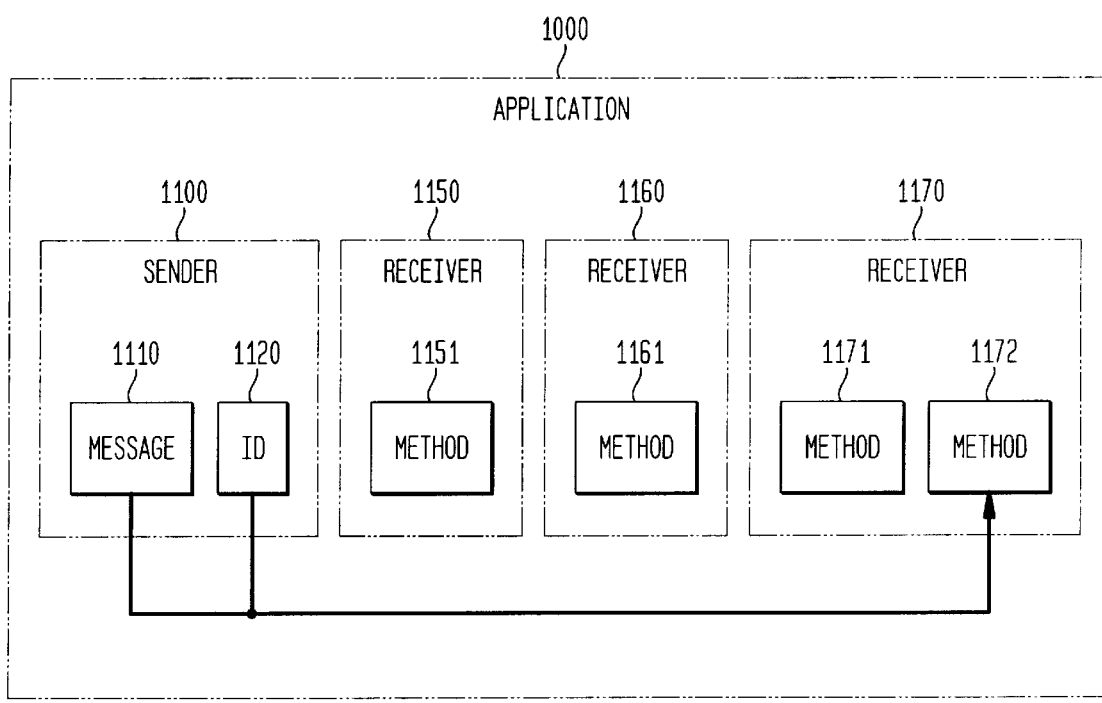
FIG. 1 is a graphical depiction of the process flow in a conventional messaging system.

FIG. 1 is a block diagram schematically depicting a prior art system of object invocation. The application 1000 comprises a plurality of receivers (objects) 1150, 1160 and 1170.

During execution of the application 1000, a sender 1100 may construct a message 1110 destined for a method 1172 of receiver 1170. The sender 1100 may send the message specifying an ID 1120 of the receiver method 1172.

A conventional messaging system allows the method 1172 of receiver 1170 to respond to messages 1110 from unknown sender 1100, however, the sender 1100 must know the identity of a receiver method 1172, prior to sending a message 1110.

Figure 2:
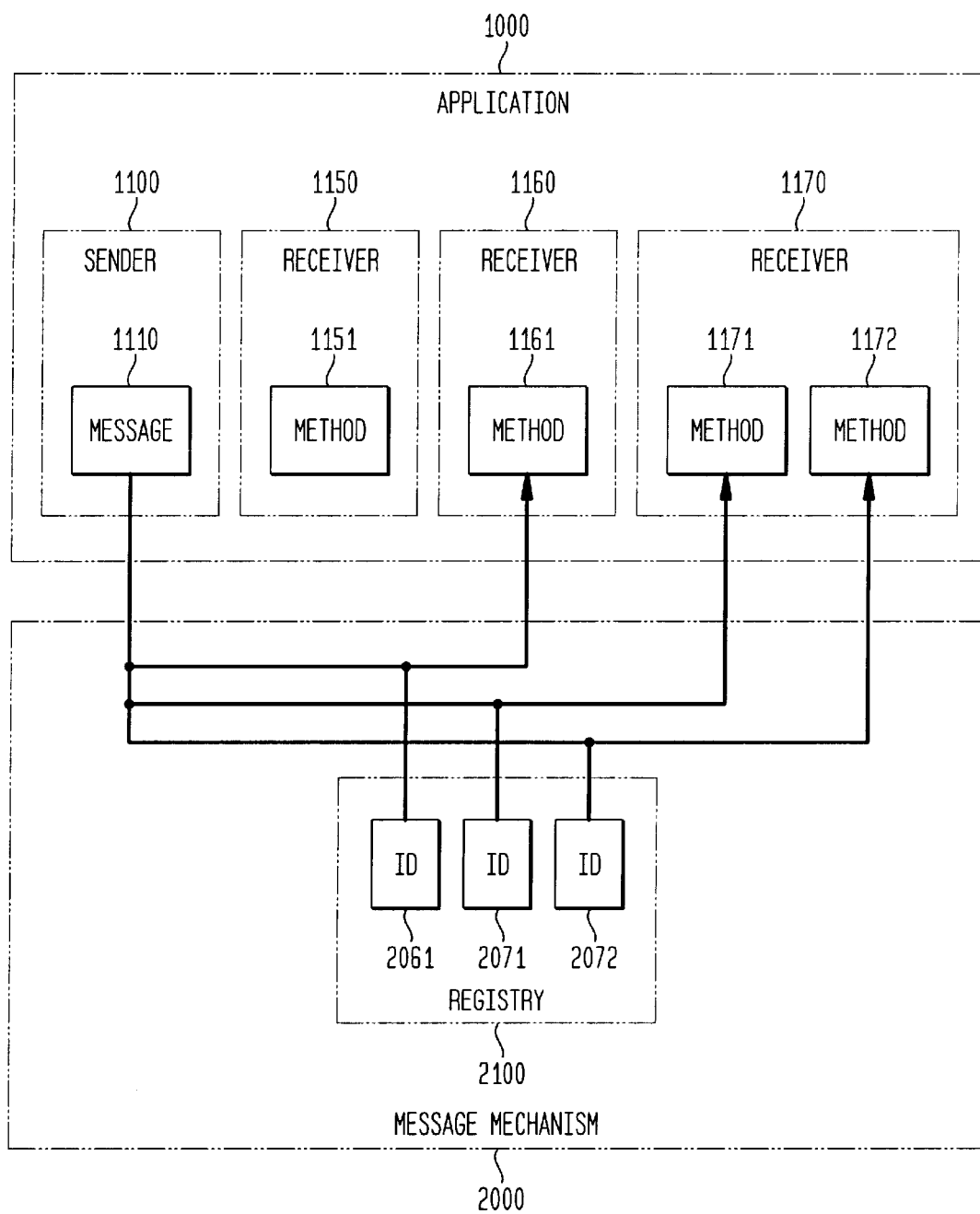
FIG. 2 is a graphical depiction of the process flow in a preferred embodiment of the present invention.

Turning now to FIG. 2, a block diagram is shown schematically depicting the present invention's system of invocation that addresses the acquaintance problem and resolves the limitations of prior art systems. The application 1000 comprises a plurality of receivers 1150, 1160 and 1170. The receivers 1150, 1160, 1170 in turn comprise a plurality of methods 1151, 1161, 1171 and 1172.

A messaging mechanism 2000 is also provided. The messaging mechanism comprises a registry 2100 for storing a plurality of registered IDs 2061, 2071 and 2072. An "invoke" function may also be provided (not shown) for a sender 1100 to pass a message to the messaging mechanism 2000.

During execution of the application 1000, the IDs of the receiver methods 1161, 1171 and 1172 are registered in the registry 2100 of the messaging mechanism 2000. The IDs may be registered as registered IDs 2061, 2071 and 2072.

The IDs of all of the methods 1151, 1161, 1171, 1172 in the application 1000 may be registered in the registry 2100; alternatively, however, as shown in FIG. 2, the IDs of only some of the methods 1161, 1171, 1172 in the application 1000 may be registered in the registry 2100. In the latter embodiment, as will be seen from the following discussion, the unregistered methods cannot directly participate in the inventive process. For example, as shown in FIG. 2, method 1151 is not registered, and, consequently, is not directly included in the described process.

During execution of the application 1000, a sender 1100 constructs a message 1110. In a preferred embodiment, the sender 1100 then passes the message 1110 to the messaging mechanism 2000.

In a preferred embodiment, messaging mechanism 2000 then sends the message 1110 to each of the receiver methods 1161, 1171 and 1172 having their ID registered in the registry 2100, seriatim, until a termination condition is reached.

In one preferred embodiment, a termination condition exists when the messaging mechanism 2000 has sent the message 1110 to each of the receiver methods 1161, 1171 and 1172 having their ID registered in the registry 2100. Each receiver method 1161, 1171 and 1172 that receives the message 1110 may independently determines whether it should act upon, or otherwise respond to the message 1110. If none of the methods 1161, 1171 or 1172, act upon, or otherwise respond to the message 1110, the message is then simply ignored.

In another preferred embodiment, a termination condition is reached when one of the receivers 1161, 1171 and 1172 respond to the message 1110 in a predetermined way. Such a response could be in the form of a return value (any return value or a prespecified return value) to the messaging mechanism 2000. Alternatively, the response could be some other action taken by the receiver such as performing a function, or storing a prespecified value in a variable accessable to the messaging mechanism 2000.

In a preferred embodiment, the message 1110 sent to the messaging mechanism 2000 may itself contain an indication from the sender 1100 that the sender 1100 desires to have the message 1110 broadcast to each receiver method 1161, 1171 and 1172. Alternatively, the message 1110 itself can contain an indication that the message 1110 should be sent to receiver only until it serviced.

It will be apparent to one of skill in the art that the messaging mechanism 2000 can add to the message 1110 a status indicator, for example, to indicate that the message has been serviced or that the message 1110 has already been sent to other receivers. Such a status indicator can be inspected by the receiver method 1161, 1171 and 1172, which method can make an independent determination of what action to take based upon the status. The status indicator could, for example, comprise the return value from previously sending the message 1110 to another receiver method 1161, 1171 or 1172.

In a preferred embodiment, the registry 2100 containing ID 2061, 2071 and 2072 of receiver method 1161, 1171 and 1172, and may also contain an indication whether a given receiver method 1161, 1171, 1172 desires to inspect all messages, or whether it desires to receive only messages not yet responded by other receivers.

It will be apparent to one of ordinary skill in the art that where the sender 1100 desires to have the message serviced by the first receiver, the messaging mechanism 2000 can use a prioritization scheme to determine an order of the receiver methods 1161, 1171 and 1172. In order to implement such a prioritization scheme, information may be stored in the registry 2100 relating to the order in which to send messages 1110. Multiple prioritization schemes may also be maintained to permit prioritization on varying criteria.

Furthermore, while monitoring for a termination condition, the messaging mechanism 2000 may monitor to determine which of the methods 1161, 1171 or 1172 responds to a particular kind of message 1110. As will be readily apparent to one of skill in the art, the messaging mechanism 2000 can then use this information to determine an order of the receiver methods 1161, 1171 and 1172. For example, the message 1110 can be sent first to the method 1161, 1171 and 1172 most likely to respond, thus reducing processing overhead. It will also be apparent to one of skill in the art that this type of monitoring can be dynamically adjusted, for example, when additional receiver methods are registered.

The present invention may be implemented as a part of or as an add-on to any sufficiently object-oriented language and for any of these languages it may be implemented in variety of ways. In a preferred embodiment it is implemented in C++ as shown in the following example:

TABLE 1

| No. | Sender | Receiver Method |
|---|---|---|
| 1 | | // in object's constructor register_receiver(this, &this_class: :balance_calculator); |
| 2 | // before constructing message action_object *the_message; the_message = new action_object; | |
| 3 | // constructing message the_message->set("request", "average balance"); the_message->set("year",1995); the_message->set("month",11); | |
| 4 | // passing message integer r_code; r code = the_message-> invoke( ); | |
| 5 | | // in balance_calculator (action_object *msg) string name; integer year,mon,day; float avg; integer ret; // obtain service name ret = msg->get("request", &name); |

TABLE 1-continued

| No. | Sender | Receiver Method |
|---|---|---|
| | | // if no such parameter, |
| | | // message is not recognized |
| | | if (ret == 0) return 0; |
| | | // if not for average balance, |
| | | // message is not recognized |
| | | if (name != "average balance") return 0; |
| | | // otherwise. . . |
| | | ret = msg->get("year",&year); |
| | | // if not year specified, |
| | | // invoke total average ballance |
| | | // calculation |
| | | if (ret == 0) avg = total_avg( ); |
| | | else { |
| | |     ret = msg->get("month", &mon); |
| | |     // if not month specified, |
| | |     // invoke yearly average balance |
| | |     // calculation for the requested year |
| | |         if (ret == 0) avg = year_avg(year); |
| | |         else { |
| | |             ret = msg->get("day", &day); |
| | |             // if not day specified, |
| | |             // invoke monthly average balance |
| | |             // calculation for the requested month |
| | |                 if (ret == 0) avg = month_avg (year,mon); |
| | |                 else |
| | |             // invoke daily average balance |
| | |             // calculation for the requested day |
| | |                 avg = day_avg (year,mon,day); |
| | |             } |
| | |     } |
| | | } |
| 6 | | msg->set("average",avg); return 1; |
| 7 | // after passing message if (r_code == 0) { // average balance not available; // use default } else { | |
| 8 |     float average; the_messsge->get("average", &average); }; | |

The sample code in Table 1 represents a communication flow between a sender and a receiver method.

Initially, the receiver methods register with the registry by calling a global function, register_receiver(void *receiver, void (receiver_class::*pf)(action_object *)). See No. 1, Table 1. In a preferred embodiment, this function is invoked in the receivers' constructor code.

As discussed above, in the present invention, the message constructed by a sender is not sent directly to a receiver. Instead, the message is passed to the messaging mechanism and then as a parameter to a specific receiver method. This allows for any type or structure that is consistent and mutually understood. On other hand, since the message may be analyzed by all receiver methods, it has to be generic enough to contain sufficient information for a receiver method to analyze it and respond appropriately.

To meet these requirements for this example, a special class, action_object is used for constructing, passing and analyzing messages. In a preferred embodiment, this class provides functionality for storing and obtaining any number of named parameters.

To construct a message, sender first creates an object of class action_object. See No. 2, Table 1.

In a preferred embodiment, the sender then stores parameters in this object using the function, set(string parameter_name, <type>parameter_value). Using function overloading, this function can allow for various types of parameter_value. In the Table 1 example sender 1100 constructs a message 1110 requesting the average monthly balance for November 1995. See No. 3, Table 1.

The object is passed to the messaging mechanism by the sender by calling the function, invokes( ), see No. 4, Table 1, and eventually passed by the messaging mechanism as parameter to the registered receiver method, balance_calculator(action_object *msg).

In a preferred embodiment, to analyze the message, the receiver method obtains parameter values by names using the function, get(string parameter_name, <type>*returned_value). Using function overloading, this function allows for various types of returned_value. See No. 5, Table 1.

In a preferred embodiment, the receiver methods can pass information back to sender 1100 using the function set to store a return information in the same instance of action_object. See No. 6, Table 1.

Preferably, if all of the receiver methods (to which the messaging mechanism sent the message) return 0, i.e. none of them responds to the message, the invoke function returns 0 to the sender. If one or more of the receiver methods responds to the message, the invoke function returns non-zero to the sender. This allows sender to determine whether a response was received, and possibly, to perform default actions. See No. 7, Table 1.

If the sender needs to obtain returned information, in a preferred embodiment, it can use the function get. See No. 89, Table 1.

As this example demonstrates, the sender does not have to be aware of the receiver 1150, 1160, 1170, nor its methods 1151, 1161, 1171, 1172. The communication is based on the business language of the application, e.g., "average balance," "year," and "month," which relate to the application's 1000 functionality, and not its implementation.

Accordingly, in a preferred embodiment of the present invention, the methods 1151, 1161, 1171, 1172 of various receivers 1150, 1160, 1170 collectively form the functional language of the application 1000. Each sender 1100 relates to the whole application 1000 by sending messages 1110. It will be apparent to one of ordinary skill in the art that most objects are both senders and receivers, and the designation herein is merely for clarity of the description. It is both contemplated, and within the scope of the invention, to have senders comprise methods to receive messages from the messaging mechanism.

The inventive approach to messaging encapsulates object existence as well as the association between objects and messages. Thus, not only are a receivers' methods transparent to a sender but so is the receiver itself. Parts of the application 1000 need not be aware of the objects comprising the application 1000 or the architecture or construction of the application 1000 in general beyond what functions or services are or intended to be available in the application 1000. It does not matter which object methods 1151, 1161, 1171, 1172, respond to which messages 1110. This allows the association of messages with object methods to be changed transparently.

The messaging mechanism 2000 is not involved in determining the receiver method 1151, 1161, 1171, 1172 for a message 1110. Instead, the messaging mechanism 2000 may send a message to all registered receiver methods 1161, 1171, 1172, or until the receiver method 1161, 1171, 1172 generates a termination condition, i.e., the receiver method 1161, 1171, 1172 invokes the appropriate response. This leaves the determination of whether or not to handle a given message 1110 and what is the appropriate response to the receiver methods.

Since each receiver method 1161, 1171, 1172 may analyze the received message 1110 independently according to its own criteria, the message analysis algorithm of each receiver method 1161, 1171, 1172 may be tuned independently to optimize performance of the process.

In summary, to participate in and receive messages 1110 from the messaging mechanism 2000, a receiver method 1151, 1161, 1171, 1172 has only to identify itself (i.e., register). The messaging mechanism 2000 passes each message 1110 to each registered receiver method 1161, 1171, 1172 until an appropriate response, i.e., a termination condition, is reached.

Although the present invention has been described in relation to particular preferred embodiments thereof, many variations and modifications and other uses will become apparent to those skilled in the art. The present invention, therefore, is not intended to be limited to the specific disclosed embodiments, but its scope is described only by the appended claims.

What is claimed is:

1. In a data processing system having a memory, a sender and at least one method capable of performing a function, a process of delivering a message to the at least one method capable of performing a function, comprising the steps of:

storing, in the memory, an application specific registry having a method identifier corresponding to at least one method capable of performing a function;

receiving a message from the sender;

selecting a method identifier in the registry based upon information contained in the registry; and, repeating the steps of selecting and sending until a termination condition is reached, thereby delivering the message to the at least one method capable of servicing the message, without requiring the sender to have specific knowledge of the identity, address, name or existence of the at least one method capable of servicing the message.

2. The process claimed in claim 1, wherein the termination condition of the repeating step is reached when each method identifier in the registry has been selected and the message is sent to the method corresponding to each selected method.

3. The process claimed in claim 1, wherein the termination condition of the repeating step is reached when the method corresponding to the selected method identifier performs a function.

4. The process claimed in claim 1, wherein the termination condition of the repeating step is reached when the method corresponding to the selected method identifier performs a prespecified function.

5. The process claimed in claim 1, wherein the termination condition of the repeating step is reached when the method corresponding to the selected method identifier provides a prespecified indication.

6. The process claimed in claim 1, wherein the message does not contain an identifier uniquely corresponding to any one of the at least one methods.

7. The process claimed in claim 1, wherein the registry further comprises a plurality of rankings, and each of the rankings corresponds to one or more method identifiers, and wherein the process of selecting, selects a method identifier based upon the plurality of rankings.

8. The process claimed in claim 1, further comprising the steps of:

receiving a return value from the method corresponding to the method identifier; and adding the return value to the message; and wherein the step of repeating further includes repeating the steps of receiving the return value and adding the return value.

9. In a data processing system having a memory, a sender and at least one method capable of performing a function, a process of delivering a message to the at least one method capable of performing a function, comprising the steps of:

storing, in the memory, an application specific registry having a method identifier corresponding to at least one method capable of performing a function;

receiving a message from the sender;

selecting a method identifier in the registry based solely upon information contained in the registry; and, repeating the steps of selecting and sending until a termination condition is reached, thereby delivering the message to the at least one method capable of servicing the message.

10. In a data processing system having a memory, a sender and at least one method capable of performing a function, a process of delivering a message to the at least one method capable of performing a function, comprising the steps of:

storing, in the memory, an application specific registry having a method identifier corresponding to at least one method capable of performing a function;

receiving a message from the sender;

selecting a method identifier in the registry based upon information contained in the registry; and, repeating the steps of selecting and sending until a termination condition is reached, thereby delivering the message to the at least one method capable of servicing the message, without the use of identity, address or name information provided by the sender.

* * * * *

UNITED STATES PATENT AND TRADEMARK OFFICE
CERTIFICATE OF CORRECTION

PATENT NO.    : 6,219,171 B1
DATED         : November 20, 1996
INVENTOR(S)   : Filkovsky et al.

It is certified that error appears in the above-identified patent and that said Letters Patent is hereby corrected as shown below:

<u>Title page,</u>
Item [75], "Yuriv" should read -- Yuriy --.

Signed and Sealed this

Seventh Day of January, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,219,717 B1 Page 1 of 1
APPLICATION NO. : 08/752544
DATED : April 17, 2001
INVENTOR(S) : Filkovsky et al.

It is certified that error appears in the above-identified patent and that said Letters Patent is hereby corrected as shown below:

<u>Title page,</u>
Item [75], "Yuriv" should read -- Yuriy --.

Signed and Sealed this

Tenth Day of July, 2007

JON W. DUDAS
*Director of the United States Patent and Trademark Office*